United States Patent [19]

Fogal

[11] Patent Number: 5,073,217
[45] Date of Patent: Dec. 17, 1991

[54] METHOD OF BALANCING A VEHICLE WHEEL ASSEMBLY

[76] Inventor: Robert D. Fogal, 15 Kenwood Rd., Chambersburg, Pa. 17201

[21] Appl. No.: 599,776

[22] Filed: Oct. 17, 1990

[51] Int. Cl.$^5$ .................... B60C 19/00; G01M 1/30; F16F 15/36
[52] U.S. Cl. .................... 156/75; 152/154.1; 301/5 BA
[58] Field of Search ............... 73/469, 470; 74/573 R, 74/573 F, 574; 152/153, 154.1, 502, 503, 504, 521; 156/75; 301/5 B, 5 BA

[56] References Cited

U.S. PATENT DOCUMENTS

| 2,909,389 | 10/1959 | Wilborn | 74/573 |
| 3,230,999 | 1/1966 | Hicks | 152/450 |
| 3,463,551 | 8/1969 | Clay | 152/154.1 |
| 4,776,888 | 10/1988 | Morrow | 152/504 |
| 4,867,792 | 9/1989 | Ronlan | 152/154.1 |

FOREIGN PATENT DOCUMENTS

| 0649236 | 9/1962 | Canada | 152/504 |
| 2308517 | 11/1976 | France | 152/521 |
| 1359462 | 7/1974 | United Kingdom | 152/521 |
| 1440186 | 6/1976 | United Kingdom | 152/521 |

Primary Examiner—Michael W. Ball
Assistant Examiner—Nancy T. Krawczyk
Attorney, Agent, or Firm—Diller, Ramik & Wight

[57] ABSTRACT

A method of balancing a wheel assembly is achieved by providing a wheel assembly which includes a tire in a range substantially between 13" and 24.5" size, providing pulverulent polymeric/copolymeric synthetic plastic material in a range substantially between 8-12 screen size and 40-200 screen size, and placing a selected screen size range of the pulverulent material in free movable relationship to the tire in a weight range substantially between ½ ounce to 24 ounces for the tire size ranges of substantially between 13" to 24.5" size.

24 Claims, 5 Drawing Sheets

METHOD OF BALANCING A VEHICLE WHEEL ASSEMBLY

BACKGROUND OF THE INVENTION

The invention is directed to a method of balancing a vehicle wheel assembly, such as wheel assemblies of passenger and truck vehicles and aircraft.

The related art directed to the present invention is exemplified by U.S. Pat. No. 2,909,389 in the name of John C. Wilborn which was granted on Oct. 20, 1959. In accordance with this patent, globular weights are placed in a tube which is eventually placed in a biased tire and the tire is eventually placed upon a wheel which is in turn placed upon a vehicle. When the wheel rotates the weights are thrown against the inner surface of the outer wall of the tube and the imbalance of the wheel is said to be corrected by the position assumed by the globular weights. This method is said to avoid the conventional method of balancing wheels of motor vehicles by crimping lead weights on the edges of the rims of the wheels, and through proper balancing, vibration of the vehicle is lessened and so too should be uneven wear on the tires, excessive wear on the bearings, the shock absorbers, the steering mechanism and other parts of the vehicle. The size, shape and design of the globular weights are not specified in this patent other than the obviously globular configuration best illustrated in FIG. 3. However, the same patentee had granted to him on Mar. 6, 1956 U.S. Pat. No. 2,737,420 in which a wheel is balanced by forming an annular channel in a rim into which a liquid is inserted along with globular weights. These globular weights are described in this patent as lead or steel shot. Accordingly, the patents collectively utilize globular weights of lead or steel shot per se or in conjunction with the liquid for balancing biased tires under the centrifugal force created during in use tire rotation.

SUMMARY OF THE INVENTION

In accordance with the method of the present invention, a wheel assembly is balanced utilizing force variations and centrifugal forces as tires rotate in use with the associated vehicles. However, in contradistinction to known prior art methods, including those of the Wilborn patents, the present balancing method utilizes forces which are present within the wheel assembly when in use and which virtually change continuously as vehicle speeds and loads change. Thus, the method seeks not simply to reduce vibration attributed to what might be loosely termed "imbalance," but also reduces vibration caused by excessive radial run-out, or lateral tread area force variation, and does so through the utilization of synthetic polymeric/copolymeric synthetic plastic granules and/or powder (pulverulent material) of specified size, weight and quantity to effect equalization of the force variations over the entire "footprint" of a tire. Thus, due to the nature, size and quantity of the polymeric/copolymeric pulverulent material, increased amplitude associated with greater tire-to-road impact forces the pulverulent material proportionately toward such areas to null or eliminate radial force variation and achieve load force equalization. In other words, a greater amount of the pulverulent material is forced to the area opposite the greater impact forces whereas a lesser amount of the granules will remain in the area opposite the lesser load forces, both sidewall-to-sidewall across the footprint of the tread and, of course, circumferentially about the tire. In this fashion irrespective of the specific load force at any point between tire and surface, eventual continuous tire rotation and tire load force variation results in displacement of the polymeric/copolymeric pulverulent material until all radial force variations have been equalized thereby placing the wheel assembly in complete "balance."

The aforesaid balancing is achieved instantaneously because the polymeric/copolymeric pulverulent material is relatively light and thus "moves" rapidly under constant variable load forces. Furthermore, the resin of the polymeric/copolymeric pulverulent material is compatible with the tire innerliners to lubricate and thereby maintain or add resiliency to the innerliners. Normally, plasticizers within the innerliners tend to migrate out of the innerliners through the body of the tire causing degradation of the rubber resulting in increased inner-liner porosity and tire sidewall cracking. Thus, the polymeric/copolymeric synthetic pulverulent material not only allow instant response to load force variation and impact force because of the light weight thereof, but long innerliner life and thus long tire life is also assured because of the lubricity characteristics of the polymeric resin pulverulent material.

With the above, and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 2:
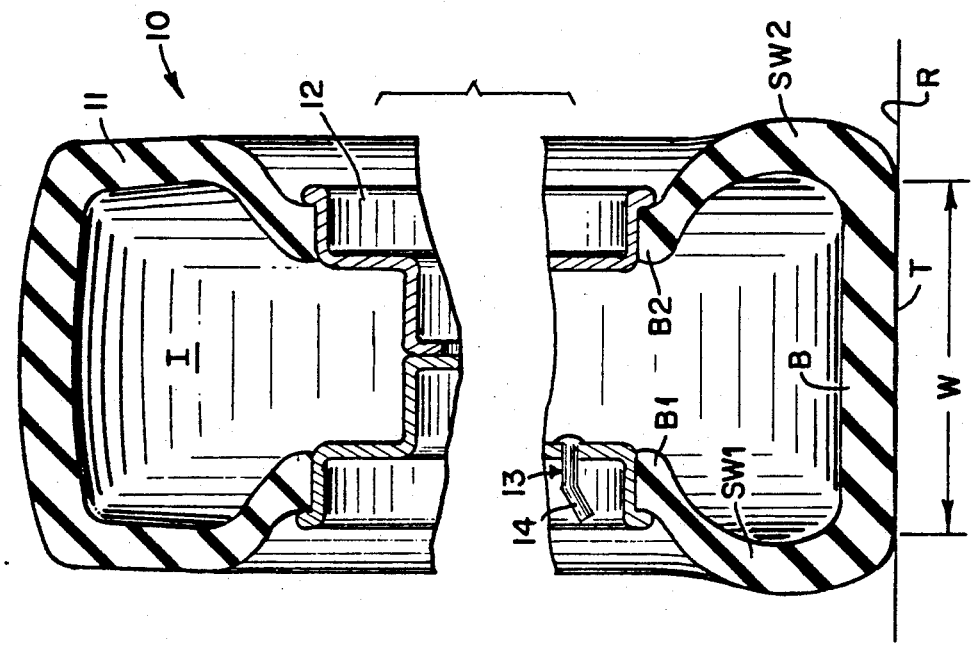
FIG. 2 is an axial vertical cross sectional view through the wheel assembly of FIG. 1 and additionally illustrates the lateral extent of the footprint when the tire rests under load upon the road surface.
Figure 1:
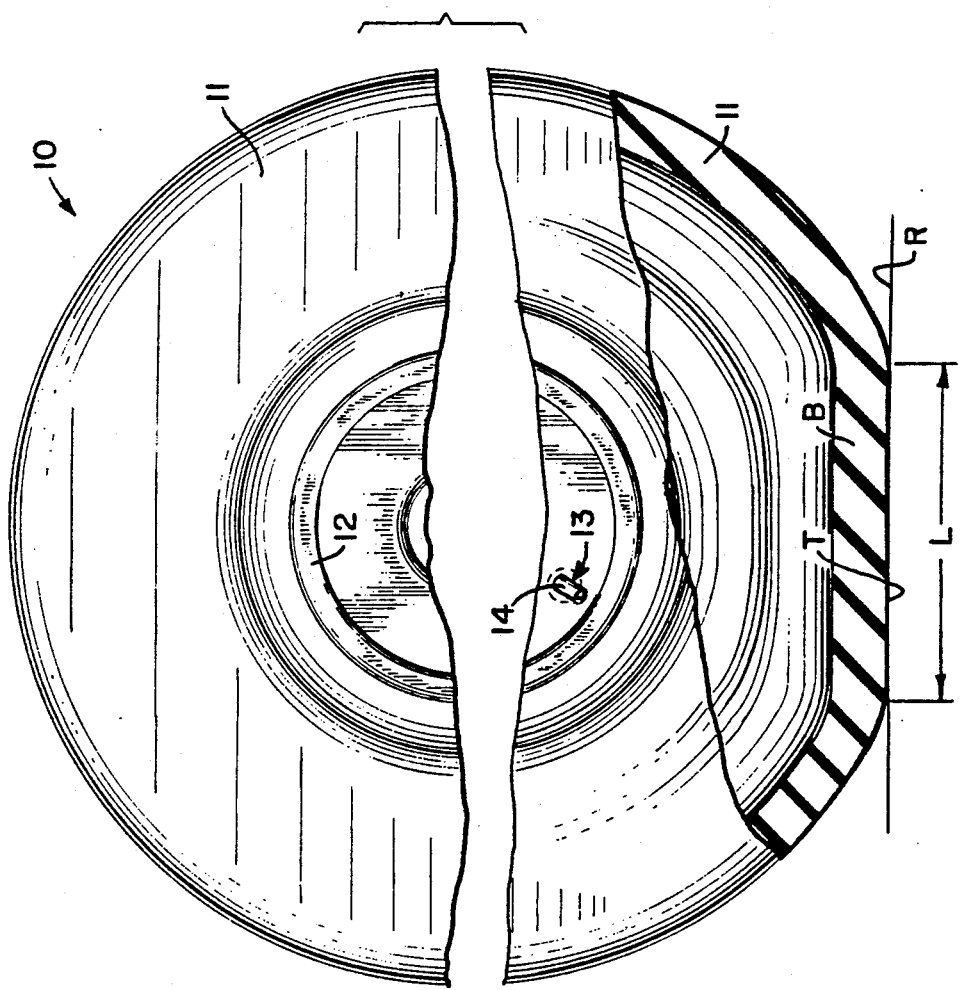
FIG. 1 is a fragmentary side elevational view of a conventional wheel assembly including a tire carried by a rim, and illustrates a lower portion or "footprint" of the tire tread resting upon and bearing against an associated supporting surface, such as a road.
Figures 3, 4, 5, 6:
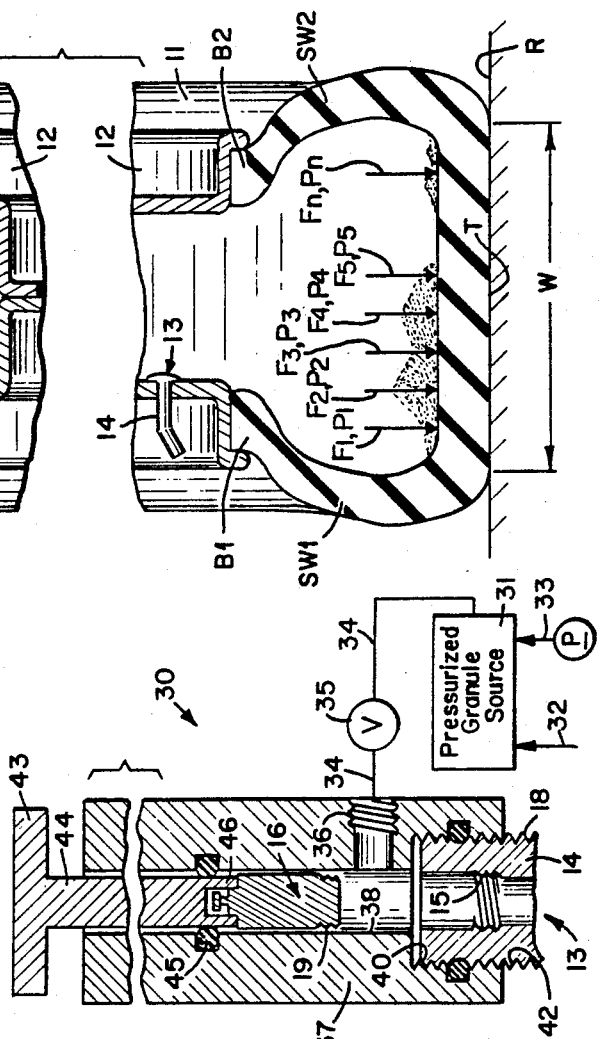
FIG. 3 is an enlarged cross sectional view identical to FIG. 2, and illustrates the manner in which polymeric/copolymeric synthetic resin pulverulent material are deposited within an interior of a tire through an associated tire valve.
FIG. 4 is a fragmentary cross sectional view of an apparatus for injecting the pulverulent material into the tire of FIG. 3, and illustrates a valve core removed from the tire valve incident to the injection of the pulverulent material into the tire through the air valve.
FIG. 5 is a cross sectional view of the wheel assembly of FIG. 3 during rotation, and illustrates a plurality of radial load forces of different variations or magnitudes reacting between the tire and the road surface as the tire rotates, and the manner in which the polymeric pulverulent material are forced from the position shown in FIG. 3 in proportion to the variable radial impact forces.
FIG. 6 is a graph, and illustrates the relationship of the impact forces to the location of the pulverulent material relative to the tire when under rolling/running conditions during balancing in accordance with FIG. 5.
Figure 7:
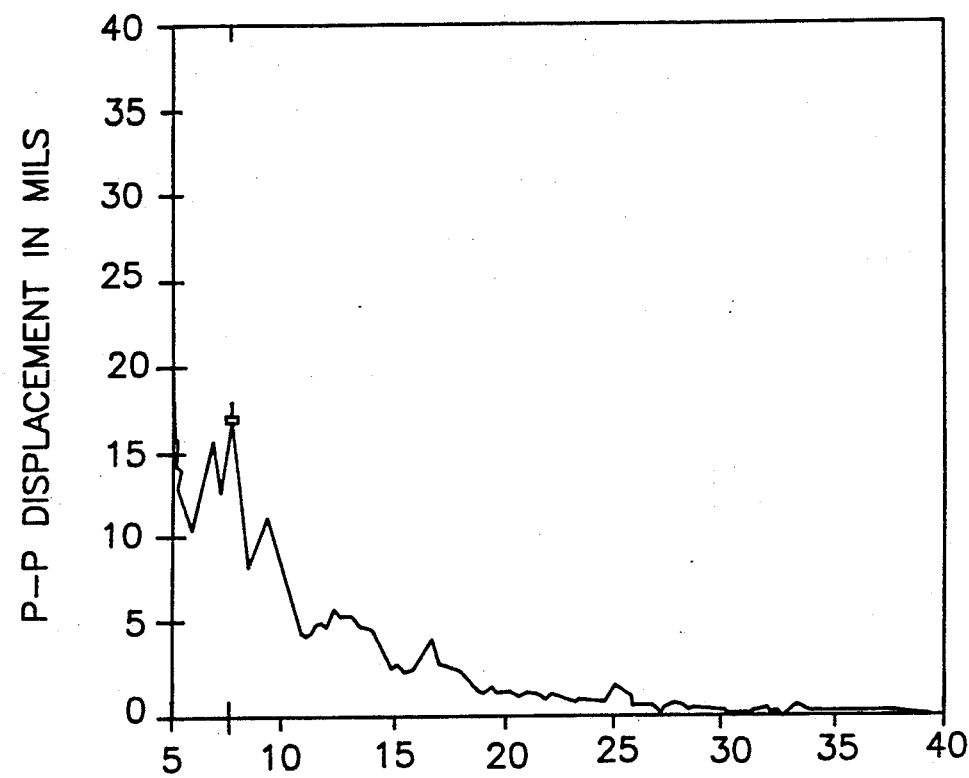
FIGS. 7-10 are graphs illustrative of the amplitude of wheel vibration detected during the testing of a test vehicle under four different test conditions.
Figure 8:
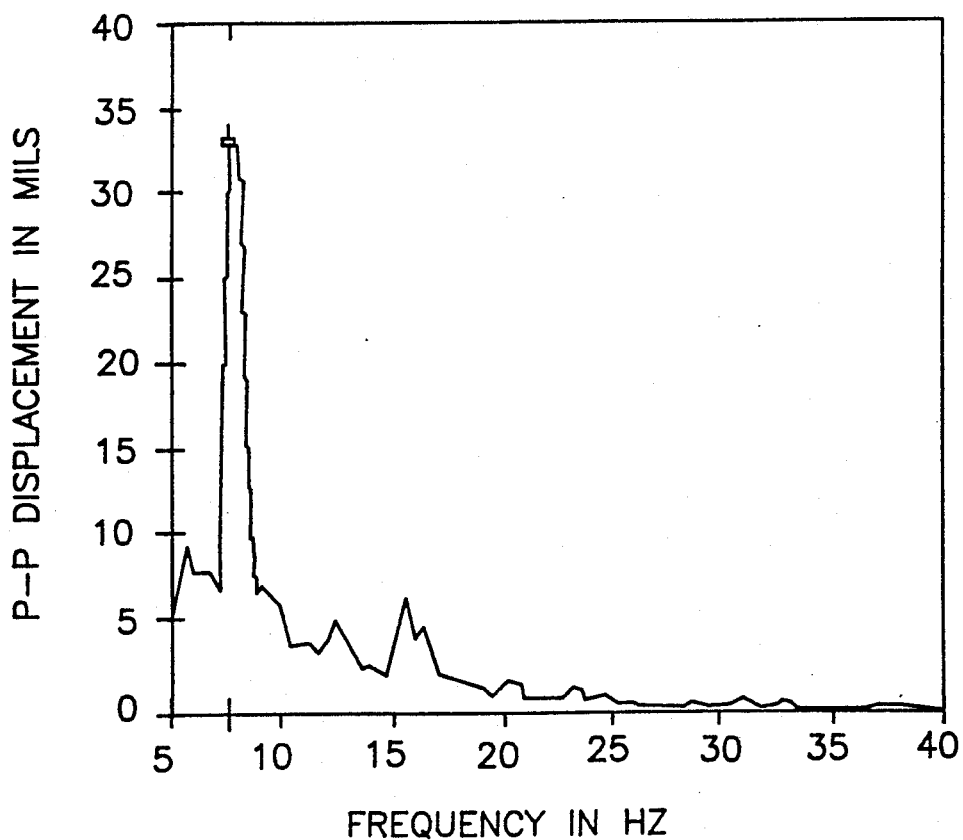
Figure 9:
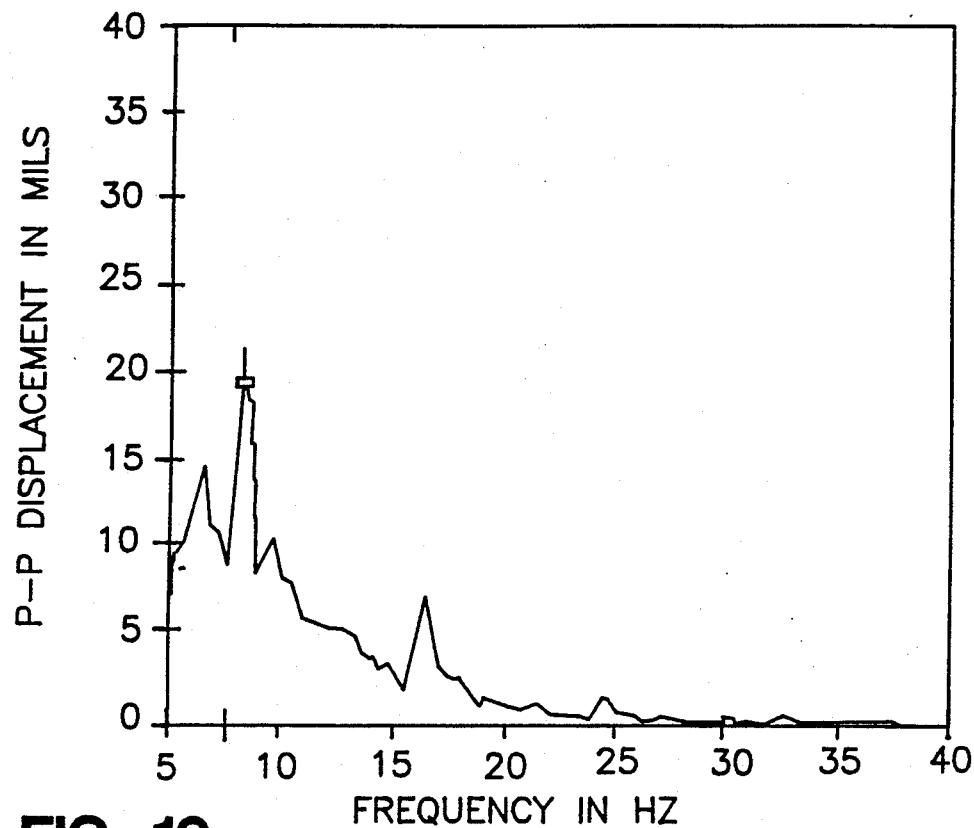
Figure 10:
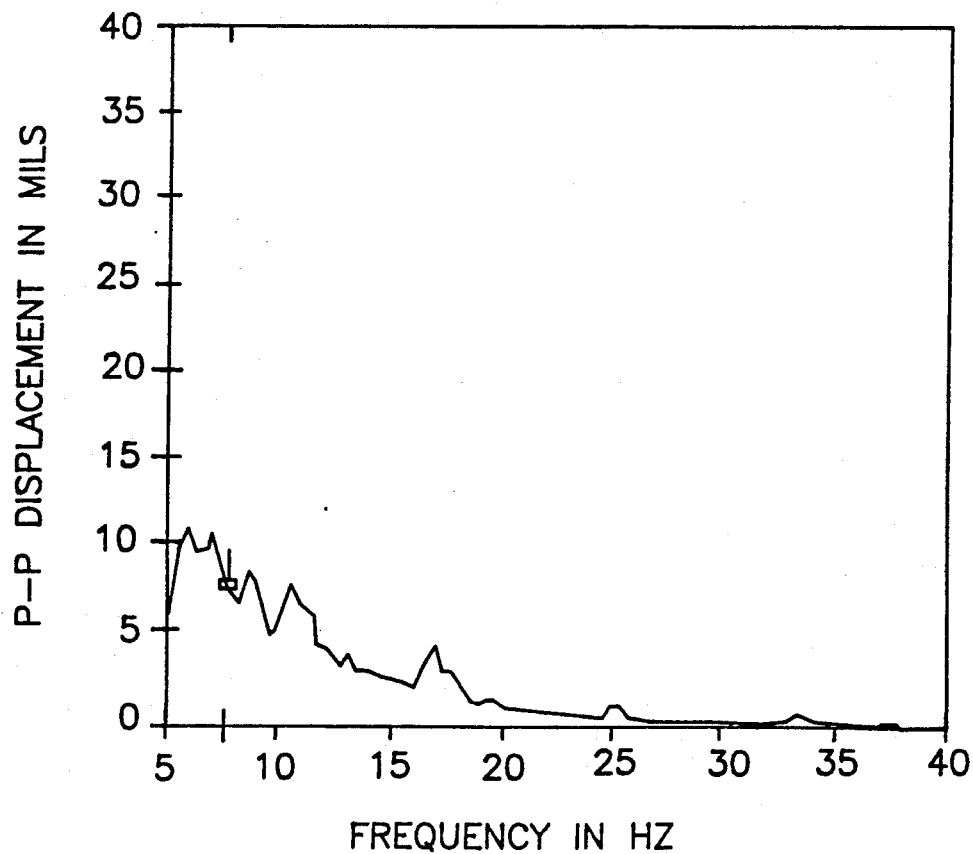

Reference is first made to FIGS. 1 and 2 of the drawings which illustrate a conventional wheel assembly generally designated by the reference numeral 10 defined by a tire 11 and a metal rim 12 carrying a tire valve or air valve 13 which includes a stem 14 having an internal thread 15 (FIG. 4) to which is normally screw threaded an externally threaded conventional valve core 16 which is illustrated removed from the stem 14 in FIG. 4. However, under normal operating/road conditions, the valve core 16 is threaded by means of the thread 15 into the stem 14 of the tire valve 13. The valve stem 14 also includes a conventional external thread 18. The tire 10 is a radial tire. A biased tire essentially does not flex radially whereas a radial tire tends to flex radially, and in use the latter can be evidenced by sidewalls SW1, SW2 (FIGS. 1, 2, 3 and 5) which tend to bulge outwardly under load when resting or running upon a surface, such as a road R. The amount of flex will vary depending upon such things as the total load of the vehicle, the speed of the vehicle, etc. and the load force can vary from wheel assembly to wheel assembly both in smaller passenger vehicles and larger vehicles, such as tractor trailers. For example, a fully loaded tractor trailer traveling at sixty miles an hour carrying heavy steel has a greater radial load force and therefore greater tire flex than the same tractor trailer traveling unloaded, as occurs quite often in the hauling industry. Furthermore, as the load increases, the flex of the tire increases and the overall radius decreases. Obviously, if a wheel assembly was conventionally "balanced" by utilizing lead weights applied to the rims, the lead weights would be effective to achieve balancing for a particular load and for a limited speed range, but not for the full variations in load force and all speeds. Therefore, even when wheel assemblies are balanced with today's sophisticated electronic balancing machines, the wheels are not balanced for all speeds and all radial force variations. However, in keeping with the present invention, such is the case when the radial tire 11 is balanced, as will be described more fully herein.

The radial tire 11 includes a lower tire portion or a footprint B defined by a length L and a lateral breadth or width W which collectively define the instantaneous cross sectional area of the tire lower portion B in engagement with the supporting surface or road R when the wheel assembly 10 is stationary or is rotating. The tire T includes a conventional external tire tread T and beads B1, B2 of the respective sidewalls SW1, SW2 which engage the rim 12 in a conventional manner.

If the wheel assembly 10 and similar wheel assemblies associated with a vehicle (not shown) are not properly/perfectly balanced, the attendant unbalanced condition thereof during vehicle wheel rotation will cause the tires to wear unevenly, wheel bearings will wear excessively, shock absorbers operate at inordinately higher amplitudes and speeds, steering linkages/ mechanisms vibrate excessively and become worn and overall vehicle ride is not only rough and dangerous, but also creates excessive component wear of the entire vehicle. These problems are significant in automobiles, but they are magnified in association with extremely large tires, such as truck tires, which are initially very expensive and if uncared for through unbalanced running, would adversely affect truck tire life, safety, and just as importantly, tire retreading. Furthermore, running an 18-wheeler or other large vehicles for hours on end, which is not uncommon in long hauling operations, causes excessive driver fatigue which in turn is potentially hazardous.

Obviously, even if the wheel assembly 10 was balanced as perfectly as possible with lead weight, whether by static or dynamic balancing, as road conditions change, as the tire 11 wears, as the load of the vehicle changes, etc., the "perfect" balanced condition of the wheel assembly 10 is far less than perfect. Accordingly, not only must the wheel assembly 10 be balanced, but the balanced condition must be retained or must change to stay in balance in response to variations in road conditions, load forces, changes in speed, etc., as might occur in conventional utilization as, for example, in the case of a loaded versus an unloaded tractor trailer. Thus, as forces vary during rotation of the wheel assembly 10 relative to the road R, the force variations must be equalized to effect or maintaining wheel balance and load force equalization, and the response time for such balancing and load force equalization should be virtually instantaneous irrespective of the tire-to-road force and/or amplitude.

In keeping with the present invention, the wheel assembly 10 is balanced and maintained in balance by utilizing within an interior I of the tire 11 of the wheel assembly 10, granules and/or powder and/or dust (pulverulent material) 20 of polymeric/ copolymeric synthetic material, such as POLYPLUS manufactured by U.S. Technology Corporation of 79 Connecticut Mills Avenue, Danielson, Conn. 06239. The pulverulent material 20 is polymerized urea formaldehyde thermoset resin which is available in the following size ranges:

TABLE A

| Screen Size (U.S. Standard mesh) | Millimeters | Inches |
| --- | --- | --- |
| 8–12 | 2.13–1.68 | .0937–.0661 |
| 12–16 | 1.68–1.19 | .0661–.0469 |
| 12–20 | 1.68–.841 | .0661–.0331 |
| 16–20 | 1.19–.841 | .0469–.0331 |
| 20–30 | .841–.595 | .0331–.0234 |
| 20–40 | .841–.420 | .0331–.0165 |
| 30–40 | .595–.420 | .0234–.0165 |
| 40–60 | .420–.250 | .0165–.0098 |
| 60–80 | .250–.177 | .0098–.0070 |

The pulverulent material 20 is non-volatile, nontoxic, noncorrosive and include the following characteristics:

TABLE B

| (Physical Characteristics of Pulverulent material 20) | |
| --- | --- |
| Hardness | |
| (Barcol) | 64 to 62 |
| (MOHS Scale) | 3.5 |
| Specific Gravity (gms/cc) | 1.47–1.52 |
| Bulk Density (lbs./cu.ft) | 58–60 |
| Maximum Operating Temperature | 300° F. |
| Chemical Nature | Inert |

The pulverulent material 20 is composed of polymerized urea molding compound (70% by weight), alpha cellulose filler (28% by weight) and pigments and additives (2% by weight).

In addition to the screen size ranges set forth in TABLE A, another range of the pulverulent material 20 found particularly effective in keeping with the present invention include the following characteristics.

TABLE C

| Screen Size (U.S. Standard mesh) | Millimeters | Inches |
| --- | --- | --- |
| 40-200 | .420-.075 | .0165-.0029 |

This range of particle size is considered "dust," and within the screen size range specified (40-200) approximately 60% of the particles are in the 50-100 screen size range, namely, approximately 60% are between 0.0117-0.0059 inch or 0.300-0.150 mm. Other characteristics of the pulverulent material 20 of TABLE C includes:

TABLE D

| Hardness | |
| --- | --- |
| (Barcol) | 54 to 62 |
| (Rockwell) | M110-120 |
| (MOHS Scale) | 3.5 |
| Density | At 20° C., 1.5 g/cm$^3$ |
| pH value | At 250 g/l H$_2$ |
| Ignition Temperature | 530° C. |
| Thermal Decomposition | 450° C. |
| Izod Impact | ASTM D256A-0.25-0.40 |
| Water Absorption | ASTM D570-24 hr.-0.4%-0.8% |
| | MIL-A-85891A-Max 10% |

A predetermined amount/weight of the pulverulent material 20 can be placed in the interior I of the tire 11 prior to the tire 11 being mounted upon the rim 12. However, it is highly desirable to inject the pulverulent material 20 into the tire interior I after the tire 11 has been mounted on the rim 12 and to do so through the tire valve or air valve 13. In order to accomplish the latter, an apparatus 30 (FIG. 4) is provided which includes a highly pressurized source 31 housing the pulverulent material 20, such as a pressurized tank of the pulverulent material 20 which can be filled in a conventional manner and pressurized in a conventional fashion. The pulverulent material 20 can be introduced into the tank 31 through a line 32 and a line 33 is connected to a high pressure air source or pump P. A line 34 includes a valve 35 which can be selectively manually opened and closed. The line 34 is connected to a threaded inlet port 36 of a nozzle 37 having an axial bore 38 and a counterbore 40 carrying an O-ring seal 41 and threads 42 which mate with external threads 18 of the valve stem 14. A handle 43 includes a rod 44 slidable and rotatable relative to the bore 38 and sealed relative thereto by another O-ring seal 45 carried by the nozzle 37. A lower end portion 46 of the rod 44 is bifurcated and mates with conventional slots (unnumbered) of the valve core 16. Suitable means (not shown) are provided to prevent the handle 43 and rod 44 from being retracted (upwardly) beyond the position illustrated in FIG. 4. If the valve core 16 is threaded in the stem 14 by virtue of the threaded engagement between the threads 19 of the valve core 16 and the threads 15 of the stem 14, the handle 43 can be rotated clockwise to unthread the valve core 16. When the threads 15, 19 are totally disengaged, air pressure within the tire interior I will push the valve core 16 and the handle 43 to the maximum outward position thereof shown in FIG. 4 which places the inlet port 36 in free communication with the bore 38 and, of course, with the interior I of the tire 11 through the stem 14. The valve 35 is opened and since the pressure within the tank or source 31 is greater than that in the tire interior I (which can be as low as zero), the pulverulent material 20 will flow through the conduit 34, the inlet port 36, the bore 38 and the stem 14 into the tire interior I and will deposit therein a pile or mound M (FIG. 3). The precise amount/weight of the powder deposited in the tire interior I can be regulated quite readily and simply as, for example, by first determining the pressure within the tire interior I, increasing the pressure over the line 33 a substantial amount beyond that in the interior I, and opening the valve 35 for a predetermined time period such that the over pressure in the tank 31 injects the precise weight of granules 20 considered appropriate to balance the particular size tire 11 involved. Once the injection of the pulverulent material 20 has been completed and the valve 35 has been closed, the handle 43 is pushed downwardly and the valve core 16 is again threaded into the stem 14 via the threads 19, 15. This process is, of course, repeated with each tire of each wheel assembly 10 of the particular vehicle involved, and once completed the vehicle is then merely driven along the road R whereupon each wheel assembly 10 is rotated and the load force or radial force variation is equalized, consequently a complete wheel assembly balancing occurs, as will be described immediately hereinafter.

Reference is made to FIGS. 5 and 6 which illustrate the innumerable radial impact forces (Fn) which continuously react between the road R and the tread T at the lower portion or footprint B during wheel assembly rotation. There are an infinite number of such forces Fn at virtually an infinite number of locations (Pn) across the lateral width W and the length L of the footprint B, and FIGS. 5 and 6 diagrammatically illustrate five such impact forces F1-F5 at respective locations P1-P5. As is shown in FIG. 6, it is assumed that the forces F1-F5 are different each from each other because of such factors as tire wear at the specific impact force location, the road condition at each impact force location, the load upon each wheel assembly, etc. Thus, the least impact force is the force F1 at location P1 whereas the greatest impact force is the force F2 at location P2. Once again, these forces F1-F5 are merely exemplary of innumerable/infinite forces laterally across the tire 11 between the sidewalls SW1 and SW2 and circumferentially along the tire interior which are obviously created continuously and which vary as the wheel assembly 10 rotates. As these impact forces are generated during wheel assembly rotation, the pulverulent material 20 relocates from the mound M (FIG. 3) in dependency upon the location and the severity of the impact forces Fn. The relocation of the pulverulent material through movement of the individual granules, powder and dust 20 is also inversely related to the magnitude of the impact forces. For example, the greatest force F1 (FIG. 6) is at position P1, and due to these greater forces F1, the pulverulent material 20 is forced away from the point P1 and the least amount of the pulverulent material remains at the point P1 because the load force thereat is the highest. Contrarily, the impact force F is the lowest at the impact force location point P2 and therefor more of the pulverulent material 20 will remain thereat (FIG. 5). In other words, at points of maximum or greatest impact forces (F1 in the example), the quantity of the pulverulent material 20 is the least, whereas at points of minimum force impact (point P2 in the example), the quantity of pulverulent material 20 is proportionately increased creating lift therefore equalizing the radial force variations. Accordingly, the vibrations or impact forces Fn force the pulverulent material 20 to continuously move away from the higher or excessive impact areas F1 or areas of maximum imbalance F1 and toward the areas of minimum impact forces or imbalance F2. The pulverulent material 20 is moved by these impact forces Fn both laterally and circumferentially, but if a single force and a single granule of the pulverulent material 20 could be isolated, so to speak, from the standpoint of cause and effect, a single granule located at a point of maximum impact force Fn would be theoretically moved 180° therefrom. Essentially, with an adequate quantity of pulverulent material 20, the variable forces Fn create through the impact thereof a lifting effect within the tire interior I which equalizes the radial force variation applied against the footprint until there is a total balance circumferentially and laterally of the complete wheel assembly 11. Thus the rolling forces created by the rotation of the tire assembly 10 in effect create the energy or force Fn which is utilized to locate the pulverulent material 20 to achieve lift and balance and assure a smooth ride. Furthermore, due to the polymeric/copolymeric characteristics of the pulverulent material 20, road resonance is absorbed as the wheel assemblies 10 rotate.

The effectiveness of the present invention and the utilization of the pulverulent material 20 to balance wheel assemblies was tested utilizing a GMC Series 7000 stake body truck with a load of nine tons. The body truck was fitted with a vibration transducer on the right front axle and vibration data was taken using a CSI Spectrum Analyzer. The front tires were Firestone 11 R22.5, the tire pressure was 90 psi and 24 oz. of the pulverulent material 20 in the 20-40 Screen Size Range (TABLE A) were placed in the tire interior I. Four runs were made and each test was made on a normal concrete highway with the truck speed being held as close as possible to 60 mph for five to seven minutes as the data was taken and averaged. The road surface was dry and the outside temperature was 72° F.

The four test runs were:
1—the truck as received without pulverulent material 20 added thereto,
2—the truck as received with 24 oz. of lead added to the right front wheel but without pulverulent material 20 in the tire thereof;
3—the pulverulent material 20 was added to each front tire in the size and amount aforesaid, and the 24 oz. of lead was left on the right front wheel, and
4—the 24 oz. of lead was removed from the right front wheel and the pulverulent material 20 was left in each tire interior.

Spectral plots of the average data of test runs 1-4 appear in FIGS. 7-10, respectively.

In summary, the vibration readings in mils (1 mil=0.001") for each of the test runs were:

| TEST RUNS | AMPLITUDE |
| --- | --- |
| TEST RUN 1-AS RECEIVED | 17.57 MILS |
| TEST RUN 2-24 OZ.ADDED RT.FRT. | 32.90 MILS |
| TEST RUN 3-PUL.MAT. ADDED | 19.16 MILS |
| TEST RUN 4-24 OZ.REMOVED | 6.93 MILS |

It is significant to note that the pulverulent material 20 (PUL.) reduced wheel vibration measurably, particularly in Test Run 4 in which all lead weight was removed. It is also apparent that the amount of the pulverulent material 20 added to the tires for the test runs was equivalent to approximately 15 mils or 22 oz. of lead at the wheel rim. A comparison between Test Run 1 and Test Run 4 evidences a remarkable lessening of vibration and thus a complete wheel assembly balance. But just as significant is the fact that even with the 24 oz. of lead left on the right front tire (Test Run 3) but with the pulverulent material 20 added, there was a significant reduction in amplitude (19.16 mils) as compared to Test Run 2 in which the right front wheel had the 24 oz. of lead weight but none of the pulverulent material therein.

In addition to the four test runs, additional tests were conducted at the test track of the Transportation Research Center at Marysville, Ohio. Several vehicles were used for these tests including a loaded tractor-trailer unit, a transit bus, and an Oldsmobile Calais. The test track of the Transportation Research Center is a seven mile track which made it possible to maintain constant speed and to take the data for each test run over exactly the same stretch of roadway.

A vibration transducer was attached to the right front axle of each of the vehicles and vibration data was taken and averaged over the same five mile track length. Each of the test vehicles was accelerated to 65 mph, unless otherwise noted hereinafter, and vibration data was recorded for five minutes starting at the same location of the test track. The data was stored in a Teac MR 30 FM Data Recorder and then analyzed and averaged using a CSI Spectrum Analyzer. The average vibration in mils (1 mil=0.001") over the five miles for each of the test vehicles and for each of the test conditions/runs per vehicle is as follows:

| | VEHICLE 1 LOADED TRACTOR-TRAILER | |
| --- | --- | --- |
| TEST RUN 1 | AS RECEIVED | 20.8 |
| TEST RUN 2 | 24 OZ. LEAD WT ADDED | 55.9 |
| TEST RUN 3 | 24 OZ. LEAD WT + 8 OZ. 20-40 PUL.MAT. 20 | 31.8 |
| TEST RUN 4 | 24 OZ. LEAD WT + 12 OZ. 20-40 PUL.MAT. 20 | 29.7 |
| TEST RUN 5 | 8 OZ. 20-40 PUL.MAT. 20 ONLY | 19.4 |
| TEST RUN 6 | 12 OZ. 20-40 PUL.MAT. 20 ONLY | 12.7 |
| | VEHICLE 2 TRANSIT BUS | |
| TEST RUN 1 | AS RECEIVED | 10.5 |
| TEST RUN 2 | 6 OZ. WT ADDED | 15.1 |
| TEST RUN 3 | 6 OZ. WT + 12 OZ 20-40 PUL.MAT. 20 | 8.8 |
| TEST RUN 4 | 12 OZ. 20-40 PUL.MAT. 20 ONLY | 6.4 |
| | VEHICLE 3 OLDSMOBILE CALAIS | |
| TEST RUN 1 | AS RECEIVED | 5.9 |
| TEST RUN 2 | SPIN BALANCE ALL TIRES | 4.6 |
| TEST RUN 3 | 1 OZ. 20-40 PUL.MAT. | 4.2 |
| TEST RUN 4 | 1 OZ. 20-40 PUL.MAT. 75 MPH | 4.4 |
| TEST RUN 5 | 1 OZ. 20-40 PUL.MAT. 20 80 MPH | 4.7 |

Figures 1, 11:
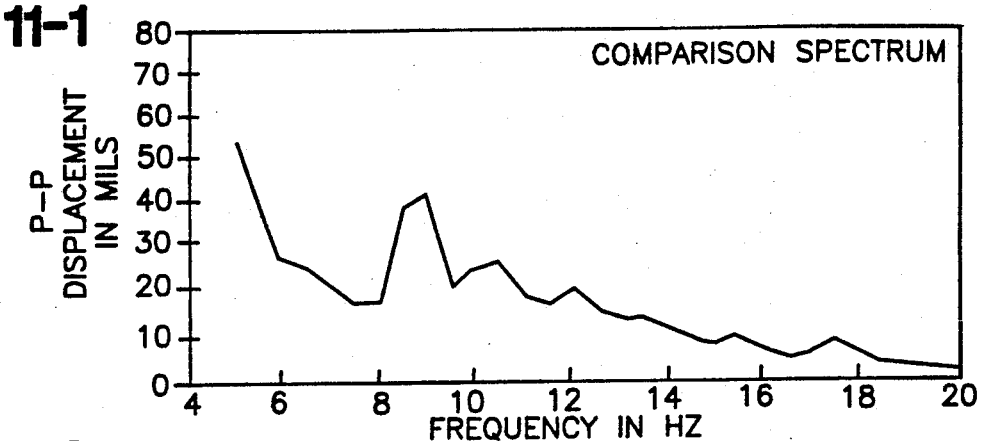
FIGS. 11 and 12 are graphs which illustrate amplitude of vibration of a test vehicle and vehicle cab vibration, respectively.
Figures 2, 11:
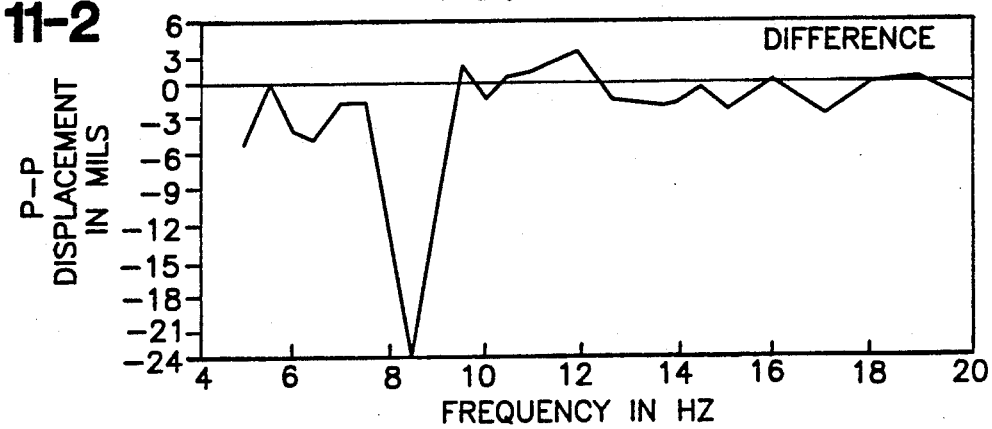

FIG. 11 is a spectral plot illustrating the difference between the vibration at wheel frequency with 24 oz of leas added to the front wheel of the tractor-trailer and with and without the pulverulent material 20. The 24 mil reduction in vibration due to the addition of the pulverulent material 20 is clearly evident.

Figures 1, 12:
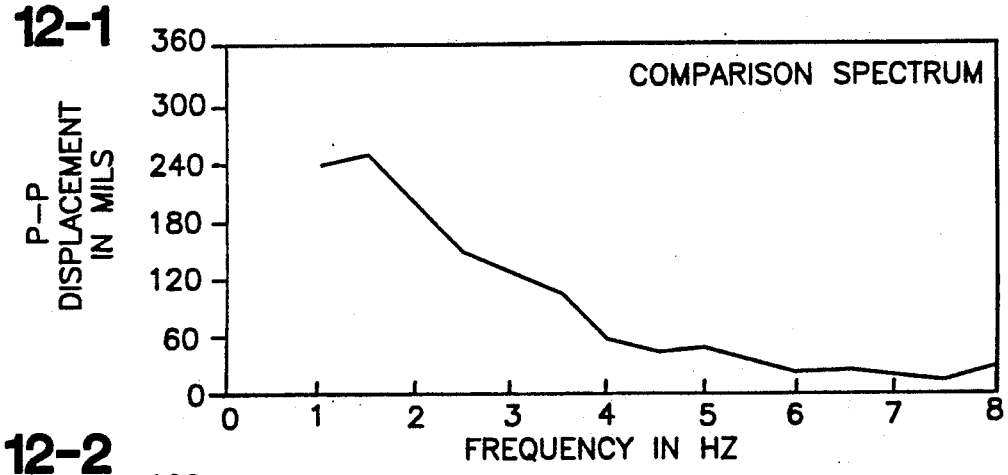
Figures 2, 12:
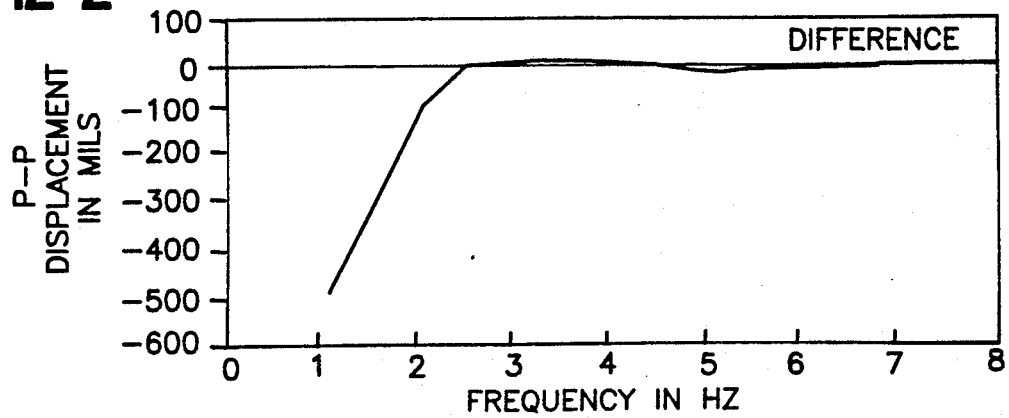

An interesting result of the addition of the pulverulent material 20 is shown in FIG. 12. The low frequency cab vibration (below 2 Hz) was reduced by more than 500 mils when the pulverulent material 20 were added to the wheels with the 24 oz lead weights.

The data indicates a reduction in the vibration at wheel frequency in all of the three vehicles tested.

Accordingly, in accordance with the method described specifically heretofore, applicant has provided a novel method of internally equalizing radial and lateral load force variations of a complete wheel assembly through utilizing the unequal amplitude generated internally of the tire across the footprint of the tread area thereof to force pulverulent material of a predetermined size, weight and volume which will respond instantaneously to these forces. This will create a lift at a 180° area from the increased amplitudes of the wheel assembly which will totally equalize the force variation of the entire wheel assembly. Consequently, 360° of the wheel assembly as well as the footprint tread area will all meet the road surface equally, hence, creating a totally smooth vibration-free ride. The same footprint (thread area) forces are also utilized to equalize the lateral forces across the width of the tread area causing the entire lateral area to meet the road surface equally. Hence, load force, lateral force and radial force variations are all "balanced" in keeping with the novel method of this invention.

Although a preferred embodiment of the invention has been specifically illustrated and described herein, it is to be understood that minor variations may be made in the method without departing from the spirit and scope of the invention as defined in the appended claims.

I claim:

1. A method of balancing and equalizing radial and lateral load force variations of a wheel assembly comprising the steps of providing a wheel assembly which includes a tire in a range substantially between 13" and 24.5" size, providing pulverulent material consisting essentially of a polymeric resin and cellulose in a range substantially between 8-80 screen size, placing a selected screen size range of the pulverulent material in the absence of a liquid carrier in free movable relationship into the tire in a weight range substantially between ½ ounce to 24 ounces for the tire size ranges of substantially between 13" to 24.5" size, rotating the wheel assembly, and subjecting the wheel assembly during the rotation thereof to impact forces which move the pulverulent material to positions at which the pulverulent material balances and equalizes radial and lateral force variations of the wheel assembly.

2. The wheel assembly balancing and radial and lateral load force variation equalizing method as defined in claim 1 wherein the step of placing the pulverulent material in free movable relationship is performed by placing the pulverulent material in the tire through a tire valve of the tire.

3. The wheel assembly balancing and radial and lateral load force variation equalizing method as defined in claim 1 wherein the step of placing the pulverulent material in free movable relationship is performed by placing the pulverulent material in the tire through a break between a bead of the tire and a bead of an associated rim of the wheel assembly.

4. The wheel assembly balancing and radial and lateral load force variation equalizing method as defined in claim 1 wherein the step of placing the pulverulent material in free movable relationship is performed by placing the pulverulent material in the tire through a tire valve of the tire, and the pulverulent material is placed in he tire through the tire valve while the tire is pressured.

5. The wheel assembly balancing and radial and lateral load force variation equalizing method as defined in claim 1 wherein the step of placing the pulverulent material in free movable relationship is performed by placing the pulverulent material in the tire through a tire valve of the tire, the tire is pressurized during the performance of the placing step, and the placing step is performed by injecting the pulverulent material into the tire at a pressure greater than that of the pressurized tire.

6. The wheel assembly balancing and radial and lateral load force variation equalizing method as defined in claim 1 wherein the step of placing the pulverulent material in free movable relationship is performed by placing the pulverulent material in the tire through a tire valve of the tire, and a valve core of the tire valve is removed from the tire valve incident to placing the pulverulent material in the tire through the tire valve.

7. The wheel assembly balancing and radial and lateral load force variation equalizing method as defined in claim 1 wherein the step of placing the pulverulent material in free movable relationship is performed by placing the pulverulent material in the tire through a tire valve of the tire, and a valve core in the tire valve is removed from the tire incident to placing the pulverulent material in the tire through the tire valve and while the tire is pressurized.

8. The wheel assembly balancing and radial and lateral load force variation equalizing method as defined in claim 1 wherein the screen size range is substantially 20-40 screen size.

9. The wheel assembly balancing and radial and lateral load force variation equalizing method as defined in claim 1 wherein the screen size range is substantially 20-40 screen size, the tire is a 18.5×24.5" tire size, and the weight of pulverulent material is substantially 24 ounces.

10. A method of balancing and radial and lateral load force variation equalizing a wheel assembly comprising the steps of providing a wheel assembly which includes a tire in a range substantially between 13" and 24.5" size, providing pulverulent material consisting essentially of a polymeric resin and cellulose in a range substantially between 40-200 screen size and placing the 40-200 screen size range of the pulverulent material in the absence of a liquid carrier in free movable relationship into the tire in a weight range substantially between ½ ounce to 24 ounces for the tire size ranges of substantially between 13" to 24.5" size, rotating the wheel assembly, and subjecting the wheel assembly during the rotation thereof to impact forces which move the pulverulent material to positions at which the pulverulent material balances and equalizes radial and lateral force variations of the wheel assembly.

11. The wheel assembly balancing and radial and lateral load force variation equalizing method as defined in claim 10 wherein the tire is a 18.5×22.5" truck tire size, and the weight of pulverulent material is substantially 24 ounces.

12. The wheel assembly balancing and radial and lateral load force variation equalizing method as defined in claim 10 wherein the step of placing the pulverulent material in free movable relationship is performed by placing the pulverulent material in the tire through a tire valve of the tire.

13. The wheel assembly balancing and radial and lateral load force variation equalizing method as defined in claim 10 wherein the step of placing the pulverulent material in free movable relationship is performed by placing the pulverulent material in the tire through a break between a bead of the tire and a bead of an associated rim of the wheel assembly.

14. The wheel assembly balancing and radial and lateral load force variation equalizing method as defined in claim 10 wherein the step of placing the pulverulent material in free movable relationship is performed by placing the pulverulent material int eh tire though a tire valve of the tire, and the pulverulent material is placed in the tire through the tire valve while the tire is pressurized.

15. The wheel assembly balancing and radial and lateral load force variation equalizing method as defined in claim 10 wherein the step of placing the pulverulent material in free movable relationship is performed by placing the pulverulent material in the tire through a tire valve of the tire, the tire is pressurized during the performance of the placing step, and the placing step is performed by injecting the pulverulent material into the tire at a pressure greater than that of the pressurized tire.

16. The wheel assembly balancing and radial and lateral load force variation equalizing method as defined in claim 10 wherein the step of placing the pulverulent material in free movable relationship is performed by placing the pulverulent material in the tire through a tire valve of the tire, and a valve core of the tire valve is removed from the tire valve incident to placing the pulverulent material in the tire through the tire valve.

17. The wheel assembly balancing and radial and lateral load force variation equalizing method as defined in claim 10 wherein the step of placing the pulverulent material in free movable relationship is performed by placing the pulverulent material in the tire through a tire valve of the tire, and a valve core of the tire valve is removed from the tire valve incident to placing the pulverulent material in the tire through the tire valve and while the tire is pressurized.

18. The wheel assembly balancing and radial and lateral load force variation equalizing method as defined in claim 1 wherein said polymeric resin is a thermoset material.

19. The wheel assembly balancing and radial and lateral load force variations equalizing method as defined in claim 1 wherein said pulverulent material includes substantially 70% by weight of said polymeric resin and 28% by weight of said cellulose.

20. The wheel assembly balancing and radial and lateral load force variation equalizing method as defined in claim 16 wherein said polymeric resin is a thermoset material.

21. The wheel assembly balancing and radial and lateral load force variation equalizing method as defined in claim 10 wherein said pulverulent material includes substantially 70% by weight of said polymeric resin and 28% by weight of said cellulose.

22. A method of balancing and equalizing radial and lateral load force variations of a wheel assembly comprising the steps of providing a wheel assembly which includes a tire in a range substantially between 13" and 24.5" size, providing pulverulent material consisting essentially of a polymeric resin and cellulose in a range substantially between 8-200 screen size, and placing a selected screen size range of the pulverulent material in the absence of a liquid carrier in free movable relationship into the tire in a weight range substantially between ½ ounce to 24 ounces for the tire size ranges of substantially between 13" to 24.5" size, rotating the wheel assembly, and subjecting the wheel assembly during the rotation thereof to impact forces which move the pulverulent material to positions at which the pulverulent material balances and equalizes radial and lateral force variations of the wheel assembly.

23. The wheel assembly balancing and radial and lateral load force variation equalizing method as defined in claim 22 wherein said polymeric resin is a thermoset material.

24. The wheel assembly balancing and radial and lateral load force variation equalizing method as defined in claim 22 wherein said pulverulent material includes substantially 70% by weight of said polymeric resin and 28% by weight of said cellulose.

* * * * *